(12) United States Patent
Vannan

(10) Patent No.: US 7,143,797 B2
(45) Date of Patent: Dec. 5, 2006

(54) AIRLESS TIRE

(75) Inventor: Frederick Forbes Vannan, Clinton, OH (US)

(73) Assignee: Frederick F. Vannan, Clinton, OH (US)

( * ) Notice: Subject to any disclaimer, the term of this patent is extended or adjusted under 35 U.S.C. 154(b) by 82 days.

(21) Appl. No.: 11/028,692

(22) Filed: Jan. 4, 2005

(65) Prior Publication Data

US 2006/0144488 A1      Jul. 6, 2006

(51) Int. Cl.
*B60C 7/12* (2006.01)
*B60C 7/18* (2006.01)

(52) U.S. Cl. .............. 152/7; 152/11; 152/246; 152/310; 152/329

(58) Field of Classification Search .............. 152/1, 152/5, 7, 11, 12, 246, 300, 301, 302, 310, 152/311, 323, 327, 328, 329
See application file for complete search history.

(56) References Cited

U.S. PATENT DOCUMENTS

| | | | | | |
|---|---|---|---|---|---|
| 1,397,795 | A | * | 11/1921 | Clifford-Earp | 152/327 |
| 1,422,899 | A | * | 7/1922 | Stouch | 152/329 |
| 1,666,234 | A | * | 4/1928 | Cullen | 156/113 |
| 1,768,348 | A | * | 6/1930 | Wescott | 428/212 |
| 1,841,773 | A | * | 1/1932 | Worsley et al. | 152/328 |
| 2,584,073 | A | * | 1/1952 | Williams | 152/329 |
| 2,709,471 | A | * | 5/1955 | Smith et al. | 152/310 |
| 3,219,090 | A | * | 11/1965 | Cislo | 152/7 |
| 4,235,270 | A | * | 11/1980 | Kahaner et al. | 152/7 |
| 4,549,592 | A | * | 10/1985 | Schroder | 152/328 |
| 4,934,425 | A | * | 6/1990 | Gajewski et al. | 152/323 |
| 5,922,151 | A | * | 7/1999 | Piper et al. | 152/310 |
| 6,227,622 | B1 | * | 5/2001 | Roderick et al. | 301/5.304 |

* cited by examiner

Primary Examiner—Russell D. Stormer

(57) ABSTRACT

This invention pertains to a tire which supports load by means of compressing the tire's elastomeric structure and requires no internal inflation pressure. The preferred embodiments utilize circumferential ribs or radially oriented ribs of elastomer to support the load.

14 Claims, 2 Drawing Sheets

AIRLESS TIRE

BACKGROUND

A large percentage of tires in use today require internal inflation pressure to support load. Tires used on automobiles, trucks, tractors, earthmovers, airplanes, and many other vehicles employ internal air pressure to carry load. Ever since the invention of the pneumatic tire internal air pressure contained within a tire structure has been the most efficient way to support a load and deliver performance expected from a tire.

Although slow speed, high load carrying vehicles like forklifts commonly use solid tires, these tires are not acceptable for most higher speed applications because of heat build up causing durability problems, harsh ride and poor traction due to small foot print on the road.

Most tires today are made from rubber which is highly hysteretic. When rubber is repeatedly flexed its temperature increases. It is common for a pneumatic rubber tire to warm up 20 degrees Fahrenheit above ambient during normal service. Most rubber automobile tires warm up at least 50 degrees Fahrenheit above ambient during high load Department of Transportation laboratory tests.

Some tires today are designed to normally run inflated but if air loss occurs they can run a short distance of 50 to 100 miles without air. These rubber run flat tires can heat up more than 150 degrees Fahrenheit above ambient during operation without air. Heat buildup is usually the limiting factor for run flat tire durability.

New materials, like polyurethane, with lower hysterisis then rubber are now being used in a small percentage of tires usually for low speed applications.

SUMMARY OF INVENTION

This invention does not utilize internal inflation pressure as a means of carrying a load. It does use the structural strength of the tire acting primarily in compression to carry the load.

This invention can utilize any suitable elastomer, including rubber, for the tire structure; however, low hysterisis elastomers such as polyurethane are preferred. All types of reinforcing materials can be used to help support load and enhance performance. These reinforcements can include beads, plies, belts, and overlays made of textiles or metals.

Engineering principles of mechanical design for load bearing structures are utilized in this invention. These principles include: the column, the arch, the dome, the sphere, and buttress for distribution of load which have been used throughout history in cathedrals, monuments, damns, roads and bridges.

The tire of this invention can be made separately from the wheel on which it is mounted or the tire and wheel can be integrally connected. Liquid elastomer or green rubber surrounds portions of the wheel so that the elastomer is integrally attached to the wheel after the elastomer solidifies.

The modulus of the elastomer can change at different radial distances from the center of rotation to provide traction at the outer diameter, tread area, and support at smaller diameters toward the wheel. Higher modulus elastomer surrounding the rim improves the durability of the connection between elastomer and wheel.

The benefits of the tire described in this invention over prior art include tire performance, cost, and manufacturability. This tire does not use inflation pressure to support the load so it cannot be deflated by a puncturing object. The tire of this invention is attached to a wheel during the tire manufacturing process. It is so uniform circumferentially and laterally that it will deliver a glass-smooth ride and not require balance correctional weights. Due to the variable spring rate capability of this design, the foot print can be tuned for optimum traction and tread wear.

This tire will not require as much costly textile or metal reinforcement as an inflated tire because the tire structure is not required to restrain high internal inflation pressure.

The manufacturing process for this tire has less steps than an inflated tire since the complex and difficult to manufacture reinforcements needed to restrain inflation are not required. The least expensive and most easily manufactured embodiments of this invention utilize liquid elastomer which can be poured into a mold cavity surrounding textile or metal reinforcements and on to or surrounding the rim portion of the wheel.

BRIEF DESCRIPTION OF DRAWINGS

FIG. 1 shows Design 10 which utilizes three circumferential ribs 4 to support the load. Rib 4A forms the outboard sidewall, rib 4C forms the inboard side wall, and rib 4B supports the center of the tread 5.

In FIG. 1, the three circumferential ribs 4A, 4B, and 4C are connected at the outer diameter by an elastomeric band 5 forming the tread area. Ribs 4A and 4C are attached to the wheel 1. Interior rib 4B can be attached to wheel 1 or not attached.

In FIG. 1, the holes 2 in wheel 1 are used to improve flow of elastomer around the wheel 1 and to help attach the elastomer to the wheel 1.

In FIG. 1 the modulus of the elastomer 3 surrounding the wheel 1 is very hard to optimize connection to wheel 1. The modulus of elastomeric band 5 is soft to optimize traction. The modulus of the circumferential ribs 4A, 4B and 4C is of medium hardness to carry the load while flexing and to transition between the hard modulus elastomer 3 surrounding the wheel 1 and the soft modulus elastomer 5 in the tread band 5.

The two toroidal components 6 are made of stiff but flexible elastomer, which will hold its shape during the molding of the rest of the tire. These toroidal components 6 form hollow gas chambers 7 inside them. The toroidal elastomer components 6 have excellent adhesion to the outer elastomer and remain attached during the life of the tire.

Figure 2:
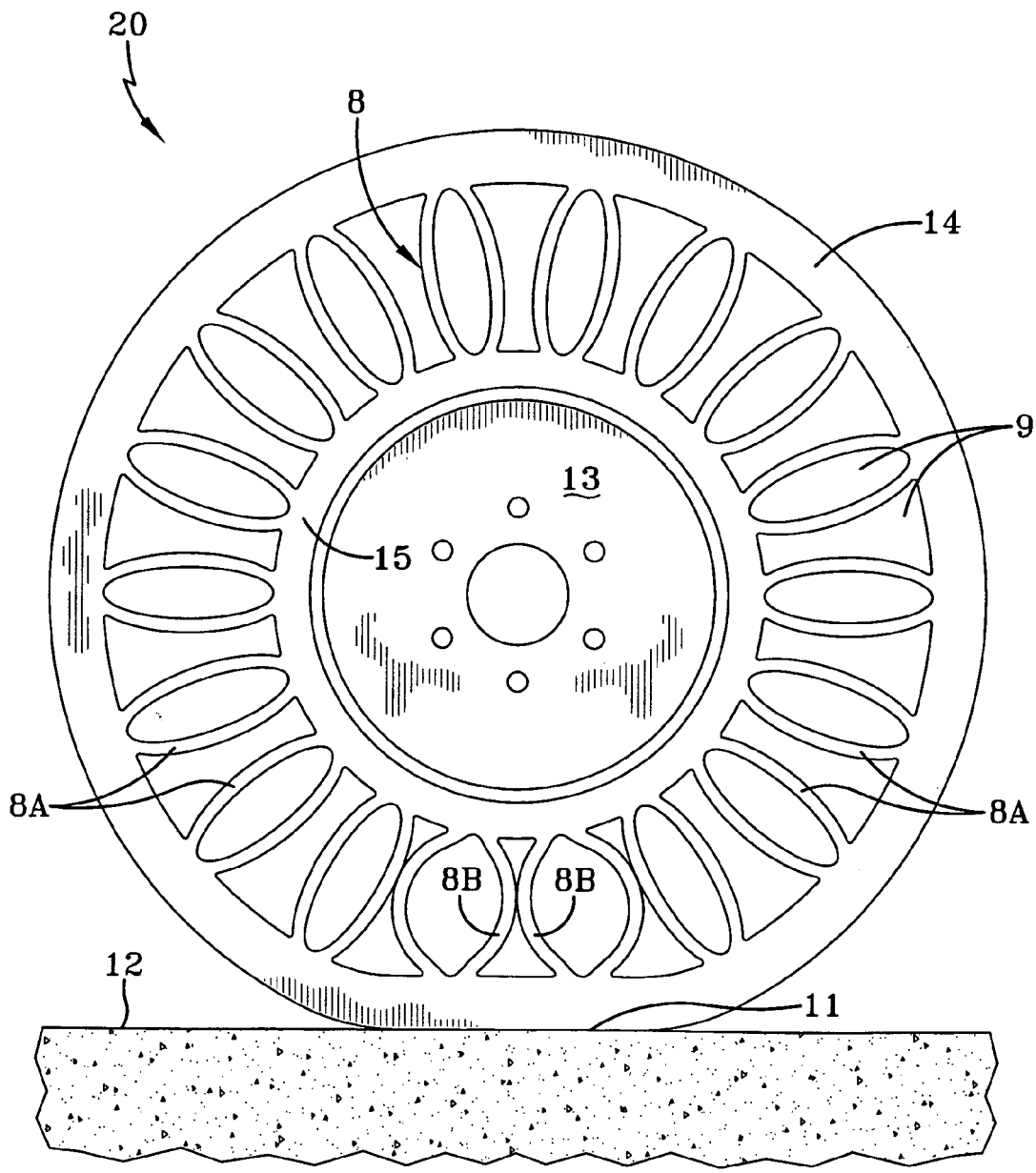
FIG. 2 shows an airless tire mounted on a traditional wheel which carries a load with many curved columns positioned around the tire.

FIG. 2 shows the second preferred Design 20 which utilizes radially oriented columns 8 to support the load. Surrounding columns 8 are air spaces 9. Columns 8 can have straight or curved sides. Columns 8 are connected at the outer diameter by elastomeric band 14 forming the tread and at the inner diameter by elastomeric band 15 which is attached to the wheel 13.

FIG. 2 shows curved columns 8A which deflect to their 8B shape in the loaded area 11 against the road 12. This design permits adjacent curved columns 8B to contact each other when loaded to increase load carrying capacity and thereby provide two different spring rates for the tire as load increases. The spring rate is low under light loading creating a large foot print 11 on the road 12 to maximize traction. As the load increases adjacent columns 8B contact and buttress each other significantly increasing load carrying capacity.

DETAILED DESCRIPTION OF THE INVENTION

Figure 1:
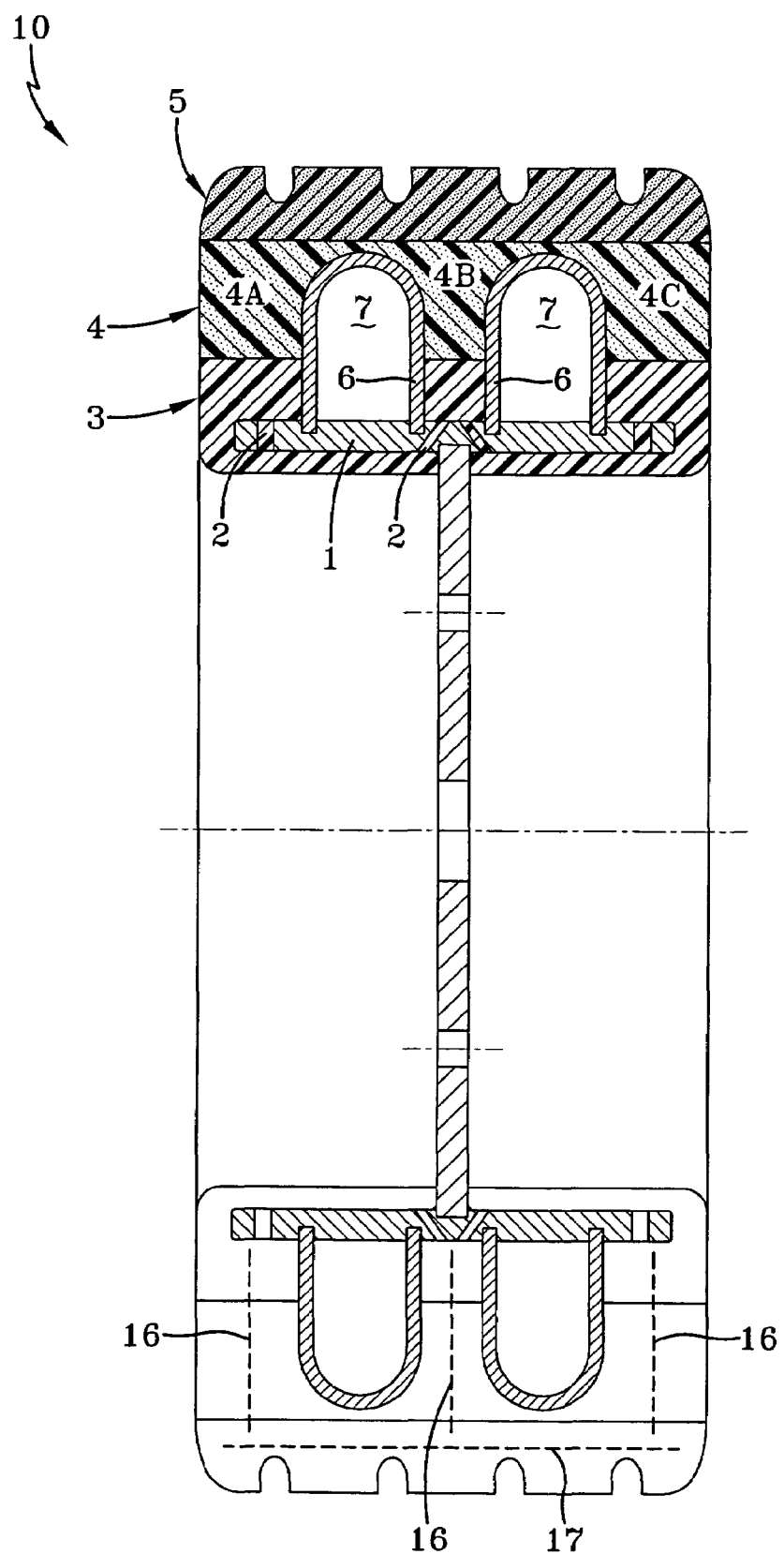
FIG. 1 shows an airless tire with embedded wheel which carries a load with multiple continuous circumferential ribs.

Both Design 10 and Design 20 can utilize fabric, metallic, composite or elastomeric reinforcements 16 and 17 FIG. 1 to help support load and improve performance.

PREFERRED EMBODIMENTS

Although there are many designs within the scope of this patent, two preferred embodiments will be described.

The first design utilizes circumferential ribs of elastomer to support the load. The ribs are connected at the outer diameter by an elastomeric band forming the tread area of the tire. There are at least three circumferential ribs supporting the load; one forming the outboard sidewall, one forming the inboard sidewall, and at least one supporting the tread band. Additional interior circumferential ribs can be used to support the center area of the tread. The ribs forming the outboard and inboard sidewalls are attached to the wheel. The interior ribs can be attached to the wheel or not attached to the wheel. The interior ribs may be designed not to touch the wheel during light loading but to contact the wheel as load is increased for additional load capacity.

The second preferred design has no circumferential ribs but uses radially oriented columns to support the load. The columns are connected at the outer diameter by an elastomeric band forming the tread area of the tire. The columns are connected at the inner diameter by an elastomeric band which is attached to the wheel. The radially oriented columns may have straight sides or curved sides. Parallel curved sides allow the columns to deflect in a controlled direction as the tire is loaded. Adjacent curved columns can be designed to contact each other at a specified tire load and deflection. When the adjacent curved columns contact each other the tire spring rate or load carrying capability is increased. Any number of radially oriented columns having a broad range of dimensions can be utilized in this design.

Reinforcing materials including textiles and metals can be used with all preferred embodiments in circumferential ribs, radially oriented columns, outer and inner diameter bands to enhance load capacity and performance.

The invention claimed is:

1. A tire comprising an elastomeric structure having an inner elastomeric band and an outer elastomeric band, and a plurality of radially oriented ribs extending between the inner elastomeric band and the outer elastomeric band;
    the ribs being curved to have a concave side and a convex side, and arranged so that adjacent ribs are paired such that the concave sides of adjacent ribs face each other and the convex sides of adjacent ribs face each other;
    whereby, when the tire is under load adjacent curved ribs will contact and buttress each other on their convex sides, and when the tire is not under load the ribs will be spaced apart.

2. The tire of claim 1, wherein the ribs are elastomeric.

3. The tire of claim 1, wherein the elastomeric structure is reinforced with one of a textile and a metallic material, or a combination of textile and metallic material.

4. The tire of claim 1, wherein the elastomeric structure comprises polyurethane.

5. The tire of claim 1, wherein the elastomeric structure is latex or rubber.

6. The tire of claim 1, wherein the hardness of the elastomers is different at different radial distances from the center of the wheel.

7. A tire having a structural support system comprising:
    an inner elastomeric circumferential band;
    an outer elastomeric circumferential band;
    at least three elastomeric radially extending circumferential ribs attached to the inner and outer bands and being axially spaced apart such that at least two hollow annular chambers are formed;
    wherein each of the inner elastomeric circumferential band, the outer elastomeric circumferential band, and the elastomeric radially extending circumferential ribs each has a different hardness.

8. The tire as set forth in claim 7 further comprising:
    the elastomeric radially extending circumferential ribs each comprise two different hardnesses.

9. The tire of claim 7, wherein the elastomeric structure is reinforced with one of a textile and a metallic material, or a combination of textile and metallic material.

10. The tire of claim 7, wherein the elastomeric structure comprises polyurethane.

11. The tire of claim 7, wherein the elastomeric structure is latex or rubber.

12. The tire of claim 7, wherein the hardness of the elastomers is different at different radial distances from the center of rotation of the wheel.

13. A tire structure comprising:
    an inner elastomeric circumferential band comprising a first material;
    an outer elastomeric circumferential band comprising a second material;
    a central circumferential elastic portion disposed between the inner and outer elastomeric bands and comprising a third material;
    a pair of toroidal components disposed in the inner elastomeric band and the central circumferential elastomeric band and spaced apart to form two annular chambers.

14. The tire structure of claim 13 further comprising:
    a wheel rim;
    the inner elastomeric circumferential band being molded around the wheel rim;
    the toroidal components are attached to the wheel rim.

* * * * *